United States Patent Office 3,324,075
Patented June 6, 1967

3,324,075
PROCESS FOR COMPOUNDING RUBBER
Nathan Burak, Prestwich, near Manchester, England, assignor to Philadelphia Quartz Company, Philadelphia, Pa., a corporation of Pennsylvania
No Drawing. Filed Oct. 7, 1964, Ser. No. 402,325
19 Claims. (Cl. 260—41.5)

This invention relates to reinforced rubber, more particularly reinforced rubber in which the reinforcing agent consists of or comprises a silica or silicate.

The incorporation of a reinforcing silica or silicate in rubber mixes is accompanied by an increase in the viscosity of the mix; this is particularly pronounced at high loadings of the reinforcing agent.

It is an object of the invention to provide an improvement in the processing of rubber with a reinforcing silica or silicate.

According to the invention there is provided a process of compounding a rubber mix containing a reinforcing silica or silicate in which process the viscosity of the mix is reduced by the inclusion therein of an organic silicate ester.

The rubber in the rubber mix employed in the process provided by this invention can be wholly natural rubber, wholly synthetic rubber or a blend of natural and synthetic rubbers of any desired ratio. Typical synthetic rubbers useful in this invention include polyisoprene rubber, butyl rubber, styrene butadiene rubber and polybutadiene rubber.

It has been found that a substantial reduction in the viscosity of the rubber mix can be obtained by the inclusion of a relatively small amount of an organic silicate ester. The extent of the reduction in viscosity is dependent on the amount of the ester added. While even with amounts of ester of less than 2% based on the weight of the silica or silicate, a significant decrease in viscosity may be obtained it will usually be necessary to use from 2% to 25% to get the best results. Amounts above 25% by weight based on the silica or silicate can also be used but at the higher levels of addition the further reduction in viscosity tends to be relatively small and with such additions the mechanical properties of the cured rubber may be undesirably affected. The preferred amount of ester is in the range 4 to 20% by weight based on the weight of the silica or silicate reinforcing agent. Based on the total weight of the rubber mix, the weight of the silicate ester used will normally be within the range 0.5 to 10%, usually from 1 to 7%.

The organic silicate may be an aliphatic, phenyl-substituted aliphatic, aromatic, aliphatic-substituted aromatic, or a mixed aliphatic aromatic silicate ester. As a further example of a suitable class of esters may be mentioned the mixed alkyl acyl silicate esters.

Examples of aliphatic silicate esters which may be used in the process of the invention are those in which the aliphatic group is an alkyl or alkenyl group having up to 15 carbon atoms. Typical of such esters are the ethyl, isopropyl, allyl, sec-amyl, and n-hexyl silicates.

As examples of suitable phenyl-substituted aliphatic silicate esters are phenyl-substituted alkyl silicate esters in which the alkl group contains up to 4 carbon atoms, such as the benzyl silicates.

The pheny silicates are typical examples of aromatic silicate esters which may be employed.

As exemplifying the class of aliphatic-substituted aromatic silicate esters are mentioned the alkaryl silicate esters in which the alkyl substitutent in the phenyl nucleus has up to 18 carbon atoms, for example the dodecylphenyl silicates.

Of the mixed aliphatic aromatic silicate esters, that is silicate esters containing both aliphatic and artomatic ester groups, examples are the mixed alkyl aryl silicate esters, the alkyl group or groups preferably containing up to 6 carbon atoms. As specific members of this class of esters may be mentioned the isopropyl phenyl silicates. In this class of esters there is preferably at least 0.5 aliphatic ester groups per aromatic ester group.

As examples of suitable mixed alkyl acyl silicate esters may be mentioned those in which the alkyl group contains up to 4 carbon atoms and the acyl group up to 18 carbon atoms; particular examples are the ethyl palmitoyl silicates.

The silicate ester may be an orthosilicate or a polysilicate or a mixture of these silicates.

The silicate ester may be included in the rubber mix in any suitable manner. In the case of a liquid ester, it is conveniently added made up as a paste with a part of the silica or silicate reinforcing agent.

The reinforcing silica employed may be a precipitated silica or a fume silica (also known as a pyrogenic silica). Examples of suitable reinforcing silicates are the precipitiated calcium silicates, precipitated calcium aluminium silicates and the precipitated sodium aluminium silicates. Mixtures of a reinforcing silica and silicate may also be used.

The silica or silicate reinforcing agent may be used alone or in combination with other rubber fillers, for example carbon blacks or calcium carbonate. The silica or silicate can be employed with other rubber fillers over a wide range of proportions. Usually, for practical purposes, the weight of the siliceous material will be at least 25% of the total weight of the filler mixture.

It has furthermore been found that when some esters are used, more especially when the reinforcing agent consists of or comprises silica and when a natural rubber or a rubber mix containing a large proportion of natural rubber is used, as well as obtaining the advantage of easier compounding, the final cured product has an improved abrasion resistance. The improvement in abrasion resistance is most pronounced in natural rubber compositions but certain synthetic rubbers—particularly polyisoprene can be blended in significant proportions with natural rubber and the improvement is still detectable. The preferred silicates in this respect are the alkyl polysilicates in which the alkyl group has up to 4 carbon atoms, particularly the ethyl and isopropyl polysilicates, and the hexyl and di-palymitoyl di-ethyl orthosilicates. In those instances where non-siliceous fillers are included in the rubber mix, the amount of silicate ester to be used will usually be greater than that required to effect a comparable increase in the abrasion resistance of a rubber based on an all-siliceous filler.

The invention will now be illustrated by the following examples. All parts are by weight.

*Example 1*

The formulation (Formulation 1) of the rubber compound tested is set out below.

Formulation 1:                                         Parts
    Natural rubber _____  100
    Reinforcing grade precipitated silica _____   42
    Zinc oxide _____    5
    Stearic acid _____    3
    Vulcafor F (a blend of di-2-benzothiazylsulphide and diphenyl guanidine) _____    3
    Sulphur _____    3
    Silicate ester _____   (1)
    Vulcanisation: 15 and 30 mins. at 142° C.

[1] As indicated below.

The compound was milled in a conventional manner, the silicate ester being added made up into a thick paste with a part of the silica.

The following properties were measured:
(a) The Mooney viscosity (ML 4) at 4 minutes at 120° C. and the Mooney scorch time at 120° C. according to B.S. 1673: Part 3:1951.
(b) The tensile strength, modulus at 300% elongation, percentage elongation at break, tear strength and hardness (B.S. degrees) of the cured compounds by the methods specified in B.S. 903.

For comparison purposes, the properties mentioned above were also measured on the formulation obtained by leaving out the silicate ester.

The results are set out in Table I.

The invention will now be illustrated by the following examples. All parts are by weight.

*Example 2*

The formulation of the rubber compound is set out below.

| | Parts |
|---|---|
| Cis-polyisoprene rubber (synthetic) | 100 |
| Reinforcing grade precipitated silica | 55 |

TABLE I

| Silicate Ester | Parts of ester | Mooney Viscosity | Mooney Scorch Time (mins.) | Tensile Strength, p.s.i. | | Modulus 300% Elong., p.s.i. | | Elong. to Break, Percent | | Tear Strength, p.s.i. | | Hardness, ° B.S. | |
|---|---|---|---|---|---|---|---|---|---|---|---|---|---|
| | | | | Cure Time (minutes) | | | | | | | | | |
| | | | | 15 | 30 | 15 | 30 | 15 | 30 | 15 | 30 | 15 | 30 |
| Isopropyl polysilicate (37–42% SiO₂) | 5 | 36 | >40 | 3,600 | 3,420 | 730 | 840 | 750 | 675 | 2,670 | 2,150 | 68 | 74 |
| Isopropyl polysilicate | 7 | 30 | >40 | 3,540 | 3,520 | 970 | 920 | 625 | 600 | 2,250 | 2,050 | 73 | 77 |
| Sec-amyl polysilicate (29% SiO₂) | 3 | 41 | >40 | 3,095 | 3,245 | 570 | 730 | 700 | 650 | 2,100 | 2,270 | 65 | 69 |
| Ethyl polysilicate (40% SiO₂) | 3 | 50.5 | >40 | 3,580 | 3,525 | 795 | 915 | 700 | 650 | 2,625 | 2,330 | 71 | 76 |
| Ethyl orthosilicate | 5 | 48 | >40 | 3,975 | 3,700 | 900 | 925 | 700 | 650 | 2,425 | 2,000 | 78 | 80 |
| n-Hexyl orthosilicate | 3 | 61 | >40 | 3,660 | 3,460 | 740 | 875 | 700 | 600 | 2,750 | 2,350 | 71 | 74 |
| Dodecyl-phenyl polysilicate (5-5% SiO₂) | 5 | 62 | >40 | 2,045 | 3,670 | 200 | 765 | 975 | 750 | 625 | 2,550 | 60 | 73 |
| Phenyl isopropyl polysilicate (1:1 ratio of phenyl to isopropyl groups; 33% SiO₂) | 5 | 44.5 | >40 | 2,720 | 3,920 | 580 | 1,000 | 725 | 675 | 1,750 | 2,345 | 65 | 78 |
| Di-palmitoyl di-ethyl orthosilicate | 5 | 47 | >40 | 3,880 | 3,540 | 840 | 840 | 750 | 700 | 2,410 | 1,810 | 77 | 80 |
| Allyl orthosilicate | 3 | 53.5 | >40 | 2,745 | 2,900 | 465 | 605 | 700 | 700 | 1,075 | 2,065 | 66 | 68 |
| Control (Formulation 1 without ester) (average of 30 tests) | | 83.5 | 40 | 3,533 | 3,508 | 700 | 788 | 730 | 685 | 2,550 | 2,485 | 71 | 74 |

The above results show that the inclusion of a silicate ester results in a considerable decrease in the viscosity of the mixture while at the same time the results show that, although the cure time in some instances may be retarded, the properties of the rubber compound referred to in the table are, except when using allyl orthosilicate, on the whole not adversely affected to any significant extent.

Table II below gives similar data to that presented in Table I for rubber compounds corresponding to Formulation 2 given below. In one case, the precipitated silicate was a sodium aluminium silicate and in another case a calcium silicate was employed. For both of these silicate materials comparative tests were done on the compound obtained by omitting the isopropyl polysilicate from the formulation.

Formulation 2:

| | Parts |
|---|---|
| Natural rubber | 100 |
| Zinc oxide | 5 |
| Stearic acid | 3 |
| Vulcafor HBS (N-cyclohexyl-2-benzothiazole sulphenamide) | 1.25 |
| Precipitated silicate | 60 |
| Sulphur | 3 |
| Non-staining antioxidant | 1 |
| Isopropyl polysilicate | 3 |

Vulcanisation: 15 and 30 mins. at 142° C.

| | |
|---|---|
| Zinc oxide | 2.2 |
| Stearic acid | 2 |
| Non-staining anti-oxidant | 0.8 |
| Sulphur | 2.1 |
| Diethylene glycol | 3.5 |
| Hexamethylene tetramine | 1 |
| Vulcafor H.B.S. (N-cyclohexyl-2-benzothiazole sulphenamide) | 1.6 |
| Tetra-methyl thiuram disulphide | 0.7 |
| Isopropyl polysilicate | (1) |

Vulcanisation: 15 mins. at 142° C.

¹ As indicated in the table.

The compound was milled in a conventional manner, the silicate ester being added to make up into a thick paste with a part of the silica.

The following properties were measured:
(a) The Mooney viscosity (ML 4) at 4 minutes at 120° C. and the Mooney scorch time at 120° C. according to B.S. 1673: Part 3:1951.
(b) The tensile strength, modulus at 300% elongation, percentage elongation at break, tear strength and hardness (B.S. degrees) of the cured compounds by the methods specified in B.S. 903.

TABLE II

| Precipitated Silicate | Mooney Viscosity | Mooney Scorch Time (mins.) | Tensile Strength, p.s.i. | | Modulus 300% Elong., p.s.i. | | Elong. to Break, Percent | | Tear Strength, p.s.i. | | Hardness, ° B.S. | |
|---|---|---|---|---|---|---|---|---|---|---|---|---|
| | | | Cure Time (minutes) | | | | | | | | | |
| | | | 15 | 30 | 15 | 30 | 15 | 30 | 15 | 30 | 15 | 30 |
| Sodium Aluminum Silicate: | | | | | | | | | | | | |
| Silicate ester present | 19.5 | 19 | 3,120 | 2,790 | 1,250 | 1,200 | 550 | 500 | 1,430 | 1,465 | 68 | 74 |
| Silicate ester absent | 43.5 | 18 | 2,970 | 2,830 | 1,520 | 1,575 | 500 | 500 | 1,570 | 1,630 | 76 | 77 |
| Calcium silicate: | | | | | | | | | | | | |
| Silicate ester present | 11.5 | 20 | 2,700 | 2,520 | 1,065 | 1,005 | 500 | 500 | 1,020 | 970 | 69 | 69 |
| Silicate ester absent | 13.0 | 19 | 2,710 | 2,430 | 1,005 | 900 | 500 | 500 | 1,160 | 1,100 | 67 | 67 |

The results are set out in the table.

Example 3

The formulation of the rubber compound of this example is set out below.

| | Parts |
|---|---|
| Butyl rubber | 100 |
| Reinforcing grade precipitated silica | 50 |
| Zinc oxide | 5 |
| Stearic acid | 2 |
| Tetra-methyl thiuram disulphide | 1.5 |
| Mercaptobenzthiazole | 1 |
| Sulphur | 1.25 |
| Isopropyl polysilicate | (1) |

Vulcanisation: 30 minutes at 158° C.

¹ As indicated in the table.

The results are set out in the table.

Example 4

The formulation of the rubber compound of this example is set out below.

| | Parts |
|---|---|
| Styrene butadiene rubber | 100 |
| Reinforcing grade precipitated silica | 60 |
| Zinc oxide | 5 |
| Stearic acid | 3 |
| Vulcafor F (a blend of di-2-benzothiazyl disulphide and diphenyl guanidine) | 2.2 |
| Hydrocarbon processing oil | 5 |
| Sulphur | 2.5 |
| Isopropyl polysilicate | (1) |

Vulcanisation: 30 minutes at 142° C.

¹ As indicated in the table.

The results are set out in the table.

Example 5

The formulation of the rubber compound of this example was the same as that of Example 2 save that 30 parts of the isoprene rubber were replaced by 30 parts of natural rubber. In this instance the cure time was 15 minutes.

The results appear in the table.

Example 7

The formulation of the rubber compound of this example is set out below.

| | Parts |
|---|---|
| Stereo specific polybutadiene rubber (40% cis) | 40 |
| Natural rubber | 60 |
| Reinforcing grade precipitated silica | 50 |
| Diethylene glycol | 2 |
| Zinc oxide | 1.5 |
| Stearic acid | 1.5 |
| Hydrocarbon processing oil | 10 |
| Vulcafor F (a blend of di-2-benzothiazyldisulphide and diphenyl guanidine) | 1.25 |
| Tetra-methyl thiuram monosulphide | 0.2 |
| Sulphur | 2.25 |
| Isopropyl polysicilate | (1) |

Vulcanisation: 15 minutes at 144° C.

¹ As indicated in the table.

The results are set out in the table.

Example 8

The formulation of the rubber compound of this example is set out below.

| | Parts |
|---|---|
| Stereo specific polybutadiene rubber (40% cis) | 40 |
| Styrene butadiene rubber | 60 |
| Reinforcing grade precipitated silica | 50 |
| Diethylene glycol | 3 |
| Zinc oxide | 1.5 |
| Stearic acid | 1.5 |
| Hydrocarbon processing oil | 10 |
| Vulcafor F (a blend of di-2-benzothiazyldisulphide and diphenyl guanidine) | 1.75 |
| Tetra-methyl thiuram monosulphide | 0.5 |
| Sulphur | 1.75 |
| Isopropyl polysilicate | (1) |

Vulcanisation: 15 minutes at 144° C.

¹ As indicated in the table.

The results are set out in the table.

TABLE

| Ex. | Type of Rubber | Parts of isopropyl polysilicate | Mooney Viscosity (ML 4) | Mooney Scorch Time (mins.) | Tensile Strength (p.s.i.) | Modulus at 300% Elong. (p.s.i.) | Elong. to Break, Percent | Tear Strength, (p.s.i.) | Hardness (° B.S.) |
|---|---|---|---|---|---|---|---|---|---|
| 2 | Isoprene (synthetic) | 0 | 82 | 12 | 2,665 | 610 | 800 | 1,535 | 85 |
|   |                      | 3 | 76 | 11 | 2,635 | 635 | 800 | 1,465 | 81 |
| 3 | Butyl | 0 | 118 | 25 | 1,900 | 240 | 900 | 1,090 | 75 |
|   |       | 5 | 84  | 27 | 1,695 | 270 | 1,000 | 785 | 66 |
| 4 | Styrene butadiene | 0 | 152 | >40 | 2,130 | 445 | 950 | 1,345 | 85 |
|   |                   | 3 | 102 | >40 | 2,120 | 775 | 650 | 845 | 86 |
| 5 | 70% Isoprene, 30% Natural | 0 | 94 | 10 | 2,835 | 665 | 800 | 1,655 | 88 |
|   |                            | 3 | 85 | 12 | 2,930 | 730 | 800 | 1,610 | 87 |
|   |                            | 5 | 66 | 20 | 3,335 | 850 | 750 | 1,020 | 80 |
| 6 | 70% Isoprene, 30% Styrene butadiene | 0 | 90 | 23 | 2,450 | 760 | 650 | 1,000 | 82 |
|   |                                      | 3 | 80 | 24 | 2,035 | 755 | 600 | 895 | 79 |
|   |                                      | 5 | 76 | 24 | 1,835 | 685 | 600 | 855 | 78 |
| 7 | 40% Stereo specific polybutadiene, 60% Natural | 0 | 82 | 17 | 1,920 | 460 | 700 | 955 | 74 |
|   |                                                 | 5 | 57 | 20 | 2,450 | 535 | 575 | 1,480 | 72 |
|   |                                                 | 7 | 45 | 20 | 2,495 | 560 | 600 | 1,230 | 65 |
| 8 | 40% Stereo specific polybutadiene, 60% Styrene butadiene | 0 | 63 | 12 | 1,840 | 710 | 600 | 695 | 73 |
|   |                                                           | 5 | 49 | 17 | 1,505 | 640 | 600 | 585 | 71 |

Example 6

The formulation of the rubber compound of this example was the same as that of Example 2 save that 30 parts of the isoprene rubber were replaced by 30 parts of styrene butadiene rubber. In this instance the cure time was 15 minutes.

The results are set out in the table.

It will be seen from the above table that in every instance the inclusion of the silicate ester has caused a lowering of the Mooney Viscosity.

The isopropyl polysilicate employed in the above examples had a silica content of 37–42% by weight.

Example 9

In this example the effect, on the abrasion resistance of the rubber compound of Formulation 1, of the inclusion of certain silicate esters is set out.

The method of determining abrasion resistance used is that described in B.S. 903:Part A 9:1957 using the Du Pont Abrasion Tester.

To check the relative effect of the organic silicates on the abrasion indices of silica rubber compounds, a series of tests was carried out using recommended carbon black formulations (see Formulation 3). The blacks employed were ISAF Black and HAF Black; these grades of carbon black are reputed to be of high abrasion resistance, ISAF being used in tyre treads and HAF in tyre walls. In addition, in the B.S. 903 Abrasion Index measurement, the silica loaded compound was always compared with either Formulation 4, which is an EPC Black and whiting compound termed in B.S. 903 Compound B, or with Formulation 5, which is an EPC Black compound termed in B.S. 903 Compound A.

The work with Formulations 4 and 5 provided a comparative scale against which the effects of the organic silicates on the rubber compound may be judged.

Formulation 3:                                          Parts
   Smoked sheet _____ 100
   Zinc oxide _____ 5
   Stearic acid _____ 3
   Carbon black _____ 50
   Dutrex R (a hydrocarbon processing oil) _____ 4
   Sulphur _____ 2.5
   Vulcafor HBS (N-cyclohexyl-2-
     benzothiazole sulphonamide) _____ 0.5
   Vulcanisation: 30 and 50 mins. at 135° C.

Formulation 4:                                          Parts
   Smoked sheet _____ 100
   Zinc oxide _____ 4
   Stearic acid _____ 3
   Di-2-ethyl hexyl phthalate _____ 3
   E.P.C. black _____ 60
   Whiting _____ 60
   Mercaptobenzthiazole _____ 1
   Sulphur _____ 3
   Phenyl-beta-naphthylamine _____ 1
   Vulcanisation: 40 minutes at 153° C.

Formulation 5:                                          Parts
   Smoked sheet _____ 100
   Zinc oxide _____ 5
   Stearic acid _____ 3
   E.P.C. black _____ 50
   Benzthiazyl disulphide _____ 1
   Sulphur _____ 3
   Phenyl-beta-naphthylamine _____ 1
   Vulcanisation: 40 minutes at 144° C.

Formulation 6:                                          Parts
   Smoked sheet _____ 30
   Cis-polyisoprene rubber _____ 70
   Zinc oxide _____ 2.2
   Stearic acid _____ 2
   Reinforcing grade precipitated silica _____ 55
   Non-staining antioxidant _____ 0.8
   Sulphur _____ 2.1
   Diethylene glycol _____ 3.5
   Hexamethylene tetramine _____ 1
   Vulcafor H.B.S. (N-cyclohexyl-2-benzothiazole
     sulphenamide) _____ 1.6
   Tetra-methyl thiuram disulphide _____ 0.7
   Isopropyl polysilicate _____ (¹)
   Vulcanisation: 15 mins. at 142° C.

¹ As indicated.

The results are set out in Table III.

TABLE III

| Natural Rubber Formulation | Volume loss mls./ 1,000 revs. | Abrasion Resistance Index Compared to— Formulation 4 | Abrasion Resistance Index Compared to— Formulation 5 |
|---|---|---|---|
| Formulation 4 | 2.42 | 100 | 67 |
| Formulation 5 | 1.63 | 148 | 100 |
| Formulation 3 using HAF Black | 1.601 | 151 | 102 |
| Formulation 3 using ISAF Black | 1.522 | 159 | 107 |
| Formulation 1 comprising— | | | |
| 1 part isopropyl polysilicate | 2.03 | 119 | 80 |
| 3 parts isopropyl polysilicate | 1.504 | 161 | 108 |
| 5 parts isopropyl polysilicate | 1.112 | 218 | 147 |
| 7 parts isopropyl polysilicate | 1.043 | 232 | 156 |
| 9 parts isopropyl polysilicate | 0.945 | 255 | 172 |
| 3 parts n-hexyl orthosilicate | 1.693 | 143 | 96 |
| 5 parts n-hexyl orthosilicate | 1.541 | 157 | 106 |
| 3 parts ethyl polysilicate | 1.917 | 126 | 85 |
| 5 parts phenyl isopropyl polysilicate (phenyl-isopropyl group ratio=1:1) | 2.2 | 110 | 74 |
| 5 parts di-palmitoyl di-ethyl orthosilicate | 2.03 | 119.2 | 80.3 |
| Formulation 6 comprising: 5 parts isopropyl polysilicate | 1.45 | 112.4 | 166.9 |
| Silica Control (Formulation 1 without ester) (average of 5 sets, i.e. 30 tests) | 2.38 | 101 | 68 |

The above results clearly demonstrate the improvement in abrasion resistance resulting from the incorporation of the silicate ester. In particular it will be noted that with isopropyl polysilicate and natural rubber, save for the smallest addition of silicate, the abrasion resistance is better than that of Formulation 3 using ISAF Black as reinforcing agent.

It is of interest to mention that in experiments on Formulation 3 using HAF Black, the inclusion of 3 and 5 parts of isopropyl polysilicate resulted in an increase in the viscosity of the rubber mix and a decrease in the abrasion resistance of the cured compound. The experiment with Formulation 6 indicates that with quite high proportions of at least one synthetic rubber in a mix containing natural and synthetic rubbers a significant increase in abrasion resistance can be obtained when an appropriate quantity of a suitable organic silicate ester is employed in an adequate quantity.

What is claimed is:

1. A process of compounding a rubber mix containing a reinforcing agent selected from the group consisting of silica and silicate, in which process the viscosity of the mix is reduced by the inclusion therein of from 2 to 25% by weight based on the weight of the said reinforcing agent of an organic silicate ester.

2. A process as claimed in claim 1, wherein the said reinforcing agent is a precipitated silica.

3. A process as claimed in claim 1 wherein the silicate ester is an aliphatic silicate ester in which the aliphatic group has up to 15 carbon atoms.

4. A process as claimed in claim 3 in which the ester is an alkyl silicate ester.

5. A process as claimed in claim 4 wherein the alkyl group has up to 4 carbon atoms.

6. A process as claimed in claim 5 wherein the ester is selected from the group consisting of ethyl and isopropyl silicate.

7. A process as claimed in claim 6 wherein the ester is a polysilicate.

8. A process as claimed in claim 1 wherein the ester is an orthosilicate.

9. A process as claimed in claim 8 wherein the ester is n-hexyl orthosilicate.

10. A process as claimed in claim 1 wherein the ester is a mixed alphatic aromatic silicate ester.

11. A process as claimed in claim 10, wherein the ester is a mixed alkyl phenyl silicate ester in which the alkyl group has up to 6 carbon atoms.

12. A process as claimed in claim 11 wherein the ester is an isopropyl phenyl silicate ester.

13. A process as claimed in claim 11 wherein the ester is a polysilicate.

14. A process as claimed in claim 1 wherein the ester is a mixed alkyl acyl silicate.

15. A process as claimed in claim 14 wherein the ester is an ethyl palmitoyl orthosilicate.

16. A process as claimed in claim 1 wherein the said silica or silicate is used in conjunction with a further reinforcing agent.

17. A process as claimed in claim 1 in which the rubber in the mix is selected from the group consisting of natural rubber and predominantly natural rubber mixes.

18. A process as claimed in claim 1 in which the rubber in the mix comprises natural rubber and polyisoprene rubber.

19. A process for the production of a vulcanised rubber having enhanced abrasion resistance which process includes the step of compounding a predominantly natural rubber mix containing reinforcing grade precipitated silica in which the viscosity of the mix is reduced by the inclusion therein of at least 4% by weight of isopropyl polysilicate based on the weight of silica.

References Cited

FOREIGN PATENTS 536,033   3/1955   Belgium.

MORRIS LIEBMAN, *Primary Examiner.*

S. L. FOX, *Assistant Examiner.*